United States Patent
Corradi

(10) Patent No.: US 6,474,899 B1
(45) Date of Patent: Nov. 5, 2002

(54) DEVICE WITH PISTONS FOR LOCKING IN POSITION LINEAR ELEMENTS MOVABLE TRANSLATIONWISE

(75) Inventor: Riccardo Corradi, Desio (IT)

(73) Assignee: Airwork Pneumatic Equipment, S.r.l., Seveso (IT)

( * ) Notice: Subject to any disclaimer, the term of this patent is extended or adjusted under 35 U.S.C. 154(b) by 0 days.

(21) Appl. No.: 09/310,751

(22) Filed: May 13, 1999

(51) Int. Cl.[7] .............. B23Q 1/28; F16B 21/00
(52) U.S. Cl. .............. 403/322.1; 188/67; 188/8; 403/366; 403/31
(58) Field of Search .............. 403/322.1, 321, 403/322.4, 325, 34, 37, 31, 109.3, 366; 188/67; 92/25

(56) References Cited

U.S. PATENT DOCUMENTS

| | | | | |
|---|---|---|---|---|
| 3,176,590 A | * | 4/1965 | Uhtenwoldt et al. | 188/67 |
| 3,643,765 A | * | 2/1972 | Hanchen | |
| 4,214,795 A | | 7/1980 | Kakuminato | |
| 4,564,088 A | * | 1/1986 | Takahashi et al. | 188/67 |
| 5,115,889 A | * | 5/1992 | Fortmann et al. | 188/67 |
| 5,184,700 A | | 2/1993 | Mainardi | |
| 5,823,300 A | * | 10/1998 | Higuchi | 188/67 |
| 6,044,934 A | * | 4/2000 | Nemeth | 188/67 |

FOREIGN PATENT DOCUMENTS

| | | |
|---|---|---|
| DE | 2719822 | 2/1979 |
| JP | 60-249546 A | * 12/1985 |

OTHER PUBLICATIONS

Abstract of JP 60 249546.

* cited by examiner

Primary Examiner—Greg Binda
Assistant Examiner—Ernesto Garcia
(74) Attorney, Agent, or Firm—Baker Botts LLP

(57) ABSTRACT

Device for locking in position linear elements movable translationwise such as rods (51) of cylinders (50) and the like, comprising an external body (11) provided internally with a chamber (13) housing elements (21) for locking the rod (51), between which resilient means (22;122) acting on the locking elements themselves are arranged, the chamber (13) having, formed inside it, two opposing cylinders (33) which are arranged on opposite sides of the rod (51) and the pistons (31) of which are designed to be arranged in a position for engagement/disengagement with/from the locking elements (21;121) so as to cause the movement towards/away from one other and the consequent unlocking/locking of the rod (51).

12 Claims, 3 Drawing Sheets

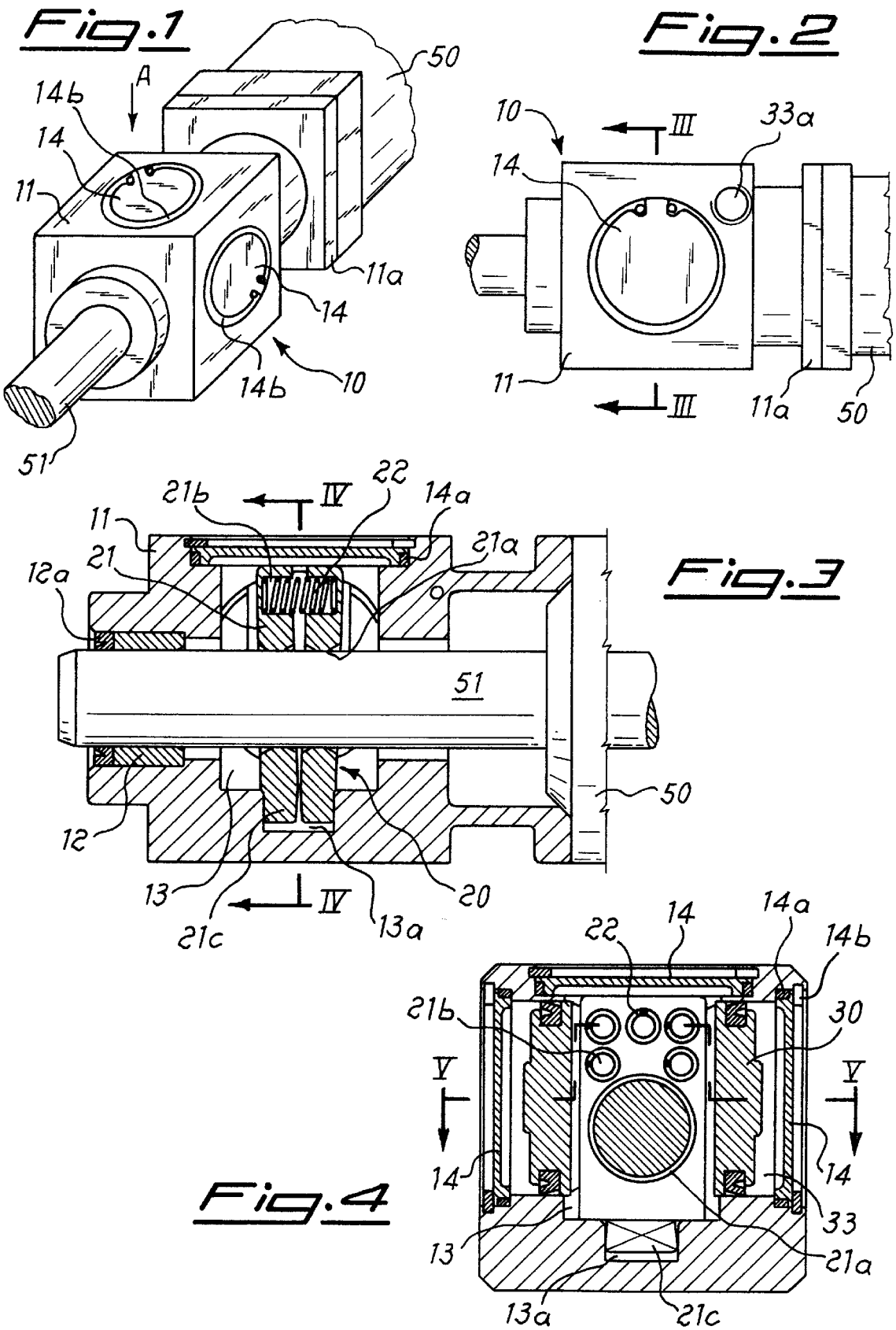

DEVICE WITH PISTONS FOR LOCKING IN POSITION LINEAR ELEMENTS MOVABLE TRANSLATIONWISE

The present invention relates to a device for locking in position linear elements movable translationwise such as rods of cylinders and the like.

It is known that in the technical sector relating to the movement or manipulation of mechanical parts there exists the need to cause the displacement of said parts from one position to another by means of so-called linear movement units generally consisting of a slide which is movable, on fixed guide rods, by means of the thrusting/recall action of an actuator such as the rod of a cylinder or the shaft of a motor.

It is also known that, once the predefined position has been reached, said movement units must be locked in position by means of auxiliary devices which are associated with the actuating and/or guide means and must be able to withstand the stresses imparted to the part and hence to the actuator during the processing operations.

Said auxiliary locking devices are basically designed to produce a high frictional force which may be exerted on the rod of the actuator or on the guide rods of the slide, without causing at the same time undesirable displacements of the slide resulting from the sudden application of the locking force.

An example of the device known in the art is illustrated in EP 0,452,702.

Although fulfilling its intended functions, said device has limitations in that the constructional form described does not allow sufficiently high locking forces to be obtained on account of the fact that, if the value of the locking force were to be increased (something which would theoretically be possible), it would then be necessary to apply an unlocking force exerted by means of a jet of pressurised air which cannot be achieved using the normal devices available in work centres.

In addition to this, the known device has a structure which does not allow its dimensions to be kept within the volume of the body for connection of the actuating member.

The technical problem which is posed, therefore, is that of providing a device for locking linear actuating members such as cylinders and the like, which allows the overall dimensions to be kept within the said volume of the body for connection of the actuating member, but which, at the same time, allows positional locking forces to be exerted which are much higher than those currently possible with the known art, assuming the same force to be applied for unlocking.

Within the scope of this problem a further requirement is that said device should be easy and inexpensive to manufacture and assemble and should be easily applicable to actuating members of the known type.

These technical problems are solved according to the present invention by a device for locking in position linear elements movable translationwise, such as rods of cylinders and the like, which comprises an external body provided internally with a chamber housing elements for locking the rod, between which resilient means acting on the locking elements themselves are arranged, said chamber having formed inside it two opposing cylinders which are arranged on opposite sides of the rod and the pistons of which are designed to be arranged in a position for engagement with said locking elements so as to cause the movement towards one other and the consequent unlocking of the rod or, alternatively, in a position for disengagement from said locking elements so as to cause the movement away from each other and the consequent positioning of the latter in a position for locking of the rod.

Further details may be obtained from the following description of a non-limiting example of embodiment of the invention provided with reference to the accompanying drawings, in which:

FIG. 1 shows a perspective view of the device according to the invention applied to a pneumatic cylinder;

FIG. 2 shows a view of the device in the direction of the arrow A of FIG. 1;

FIG. 3 shows a cross-section along the plane indicated by III—III of FIG. 2;

FIG. 4 shows a cross-section along the plane indicated by IV—IV in FIG. 3;

FIG. 8b shows a cross-section along the plane indicated by VIIIb—VIIIb in FIG. 8a; and FIG. 8c shows a cross-section along the plane indicated by VIIIc—VIIIc of FIG. 8a.

Figure 5A:
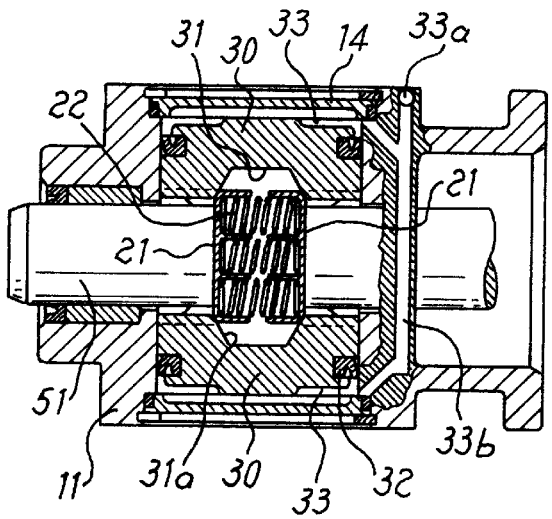
FIG. 5a shows a cross-section along the plane indicated by V—V of FIG. 4 of the device in position for locking of the cylinder rod.
Figure 5B:
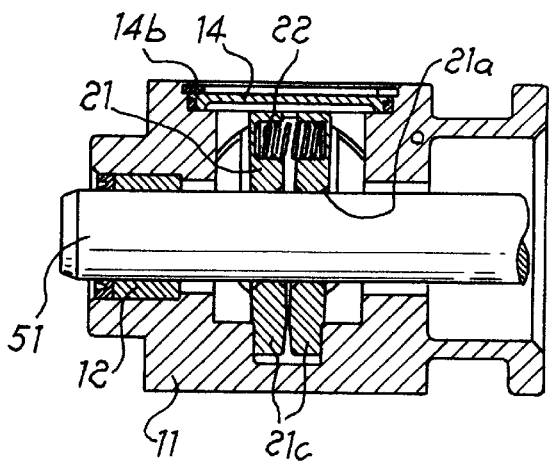
FIG. 5b shows a cross-section similar to that of FIG. 3 of the device in the configuration for locking of the cylinder rod.

As illustrated, the device 10 according to the invention is composed of a substantially cube-shaped body 11 from which a flange 11a extends for connection to the actuating member indicated by way of example as a cylinder 50, the rod 51 of which passes through the locking device, guided by a bushing 12 with associated stem cleaning element 12a, and extends axially on the opposite side of the cylinder for connection to a slide or the like not shown.

The body 11 has internally a chamber 13 with openings closed by associated covers 14 with seals 14a retained in position by resilient rings 14b of the Seeger type. A surface of the chamber 13 has a seat 13a for receiving tongues 21c, with a chamfered inner side, forming one end of the elements 20 for locking the rod 51.

More particularly, said locking elements 20 consist of two identical blades 21 which are arranged facing one another and have a central hole 21a with an internal diameter slightly bigger than the external diameter of the rod 51 so as to allow the entry and the relative sliding of the latter.

The internal surface of each blade 21 has, formed on it, seats 21b which are designed to receive partially springs 22 arranged substantially parallel to the rod 51.

As illustrated, the two blades 21 are mounted facing one other so that the springs 22 exert a symmetrical thrusting action on the ends of the blades themselves opposite to the respective tongues 21c.

Figure 6A:
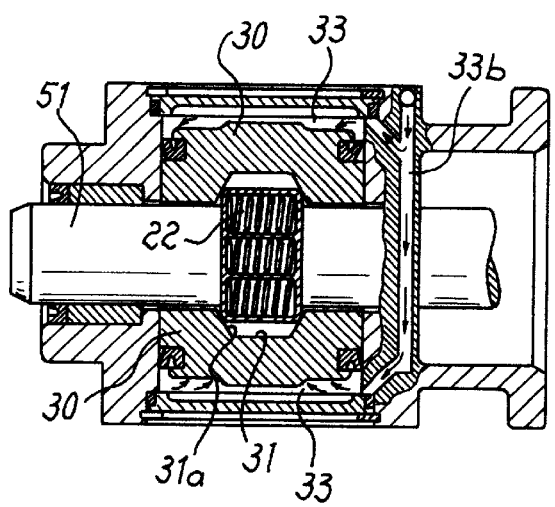
FIG. 6a shows a cross-section along the plane indicated by V—V of FIG. 4 of the device in position for unlocking of the cylinder rod.
Figure 6B:
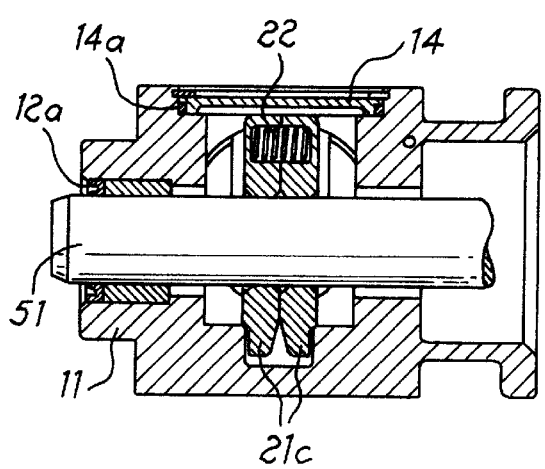
FIG. 6b shows a cross-section similar to that of FIG. 5b of the device in the configuration for unlocking the cylinder rod.

The chamber 13 also has, arranged inside it, two pistons 30, each of which has (see FIG. 6a) a groove 31 with inclined sides 31a formed on the surface facing the rod 51.

Said pistons 30 are mounted facing each other on opposite sides of the rod 51 inside two cylinders 33 formed by the chamber 13 itself and the said covers 14 closing the body 11 of the device; annular elements 32 ensure the necessary seals of the cylinders 33.

Said pistons 30 are operated by means of compressed air supplied through a threaded entry hole 33a (FIG. 2) and ducts 33b formed in the body 11 (FIG. 5a).

In this way the pistons 30 may be symmetrically pushed towards the rod 51 so as to engage by means of the grooves 31 with the blades 21, as will become more clear from the description of operation provided below.

As illustrated in FIGS. 5a, 5b and 6a, 6b, the device operates in the following manner:

Under normal conditions (FIG. 5a) the two cylinders 33 are discharged and the two pistons 30 are pushed far from the rod 51 by the combined action of the springs 22 and the inclined surfaces 31a of the grooves 31 in the pistons 30; in this way the seat 13a is almost totally disengaged from the blades 21 and consequently the force exerted by the springs 22 causes the movement away from one another of the blades 21 themselves (FIG. 5b) which, on account of the engagement of the respective tongues 21c into the seat 13a, tend to rotate about the tongues themselves, which act as a pivot, arranging themselves with their longitudinal axis inclined with respect to the rod 51 on which the edges of the holes 21a exert a frictional force suitable for causing locking of the rod itself.

When it is required to make the rod 51 perform a translatory movement, compressed air is supplied to the cylinders 33 causing the movement, towards the axis, of the two pistons 30 which, by means of the inclined surfaces formed by the walls 31a of the respective grooves 31, overcome the thrusting action of the springs 22 and cause the symmetrical movement, towards one another, of the two blades 21.

Consequently the two blades rotate with respect to the pivot formed by the tongues 21c and tend to assume a position parallel with one another and with the axis of the hole 21a parallel to the longitudinal axis of the rod 51 which is no longer impeded and is able to slide freely.

Once the predefined position has been reached, the cylinders 33 are discharged, allowing the springs 22 to bring back the pistons 31 and the blades 21 into the initial locking position.

Figure 7:
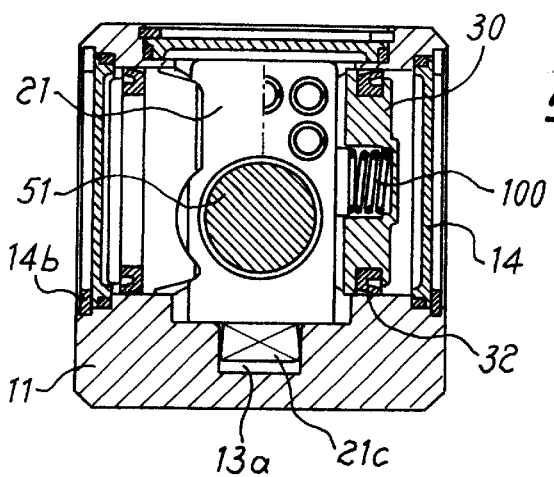
FIG. 7 shows a first variation of embodiment of the device according to the invention.

FIG. 7 shows a variation of embodiment of the device in which a spring 100 is arranged between the groove 31a of the piston 31 and the blade 21.

With this configuration the return of the piston into the position corresponding to locking of the rod is facilitated by the auxiliary spring 100, this enabling the load of the springs 22 to be reduced, with obvious practical advantages.

Figure 8A:
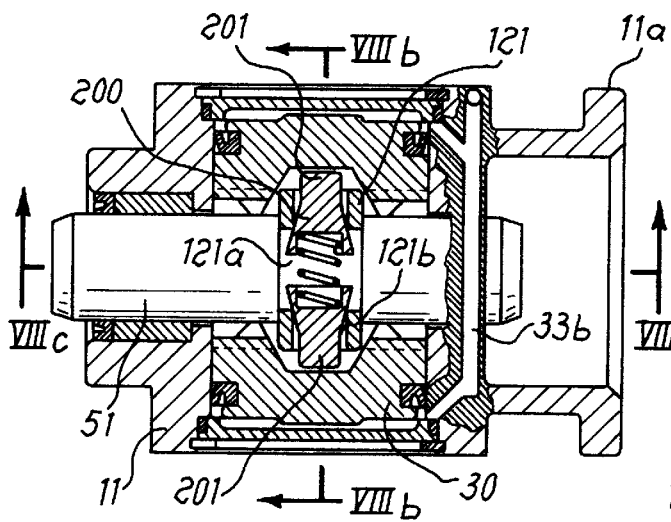
FIG. 8a shows a cross-section similar to that of FIG. 5a of a second variation of embodiment of the device according to the invention.
Figure 8B:
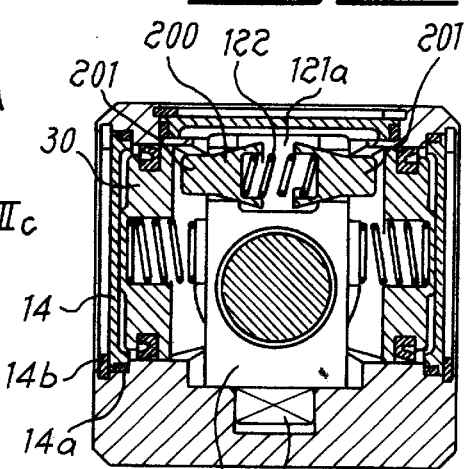
Figure 8C:
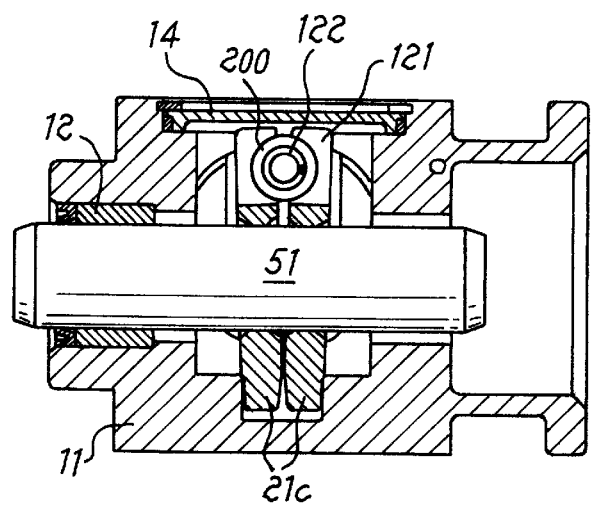

FIGS. 8a, 8b, 8c show a further variation of embodiment in which it is envisaged that the end opposite to the tongue 21c of each blade 121 is formed in the manner of a longitudinal groove 121a, the facing walls of which have a semi-circular seat 121b designed for engagement with a frustoconical wedge 200, the vertex of which is formed by a cylindrical portion 201.

Said frustoconical wedge 200 has a surface with an inset base for allowing the abutment and guiding of a spring 122 arranged between the two frustoconical wedges arranged opposite one another. Said spring 122 therefore acts in a transverse direction with respect to the axis of the rod 51 of the cylinder 50.

With this configuration the thrusting action which causes splaying of the blades 121 is transmitted by the springs 122 to the blades themselves by means of the inclined surface of the wedge 200 which allows the load of the springs to be kept small.

When the pistons 30 are actuated so as to cause unlocking of. the rod 51, the bottom surface of the grooves 31 encounters first of all the cylindrical head 201 of the respective wedge 200 and, acting against it, causes disengagement thereof from the seat 121a of the blades 121 which are no longer forced apart.

Continuing its travel towards the rod 51, each groove of the pistons has its inclined walls 31a in contact with the end of the blades 121 and, no longer encountering opposition resulting from the thrust of the spring 122, causes rotation of the blades into the vertical position for disengagement from the shaft without the need for high forces.

It is therefore obvious how the simultaneous action of the springs 22 in one case or the multiple action of the frustoconical wedges 122 in the other case ensures a very high locking force which allows application of the device even to cylinders which operate at a pressure of 10 bar with perfect locking of the rod; at the same time, however, the multiple action resulting from the pistons inside the body of the device allows the force which causes unlocking of the rod to be kept small, this being a factor which is decisive, particularly in the case where said force is provided by means of compressed air which cannot exceed the normal compression values permitted in work centres.

What is claimed is:

1. A device for locking in position a linear rod that is translatable axially, the device comprising an external body provided internally with a chamber adapted to receive the rod, a pair of locking elements movably supported by the external body and received in the chamber and configured so as to engage and lock the rod in locking positions of the locking elements, biasing members biasing the locking elements away from each other to the locking positions, a first cylinder formed in the external body and arranged on a first lateral side of the chamber, a first piston received in the first cylinder for movement toward and away from the rod, a second cylinder formed in the external body and arranged on a second lateral side of the chamber opposite said first lateral side of the chamber, a second piston received in the second cylinder for movement toward and away from the rod, the first and second pistons having each a groove configured to engage a respective end of the locking elements upon movements of the pistons toward the rod so as to move the locking elements against biasing of the biasing members from the locking positions to unlocking positions out of engagement with the rod and to disengage the end of the locking elements upon movements away from the rod so as to allow the biasing members to move the locking elements to the locking positions thereof in engagement with the rod, said each said groove having inclined side surfaces.

2. A device for locking in position a linear rod that is translatable axially, the device comprising an external body provided internally with a chamber adapted to receive the rod, a pair of locking elements movably supported by the external body and received in the chamber and configured so as to engage and lock the rod in locking positions of the locking elements, biasing members biasing the locking elements away from each other to the locking positions, a first cylinder formed in the external body and arranged on a first lateral side of the chamber, a first piston received in the first cylinder for movement toward and away from the rod, a second cylinder formed in the external body and arranged on a second lateral side of the chamber opposite said first lateral side of the chamber, a second piston received in the second cylinder for movement toward and away from the rod, the first and second pistons having each a groove configured to engage a respective end of the locking elements upon movements of the pistons toward the rod so as to move the locking elements against biasing of the biasing members from the locking positions to unlocking positions out of engagement with the rod and to disengage the end of the locking elements upon movements away from the rod so as to allow the biasing members to move the locking elements to the locking positions thereof in engagement with the rod, the external body having a seat arranged to receive a portion of the locking elements that is spaced apart from the end that is engaged by the each said groove.

3. The device according to claim 2, wherein the portion of each locking element received in the seat is a tongue with a chamfered internal surface.

4. A device for locking in position a linear rod that is translatable axially, the device comprising an external body provided internally with a chamber adapted to receive the rod, a pair of locking elements movably supported by the external body and received in the chamber and configured so as to engage and lock the rod in locking positions of the locking elements, biasing members biasing the locking elements away from each other to the locking positions, a first cylinder formed in the external body and arranged on a first lateral side of the chamber, a first piston received in the first cylinder for movement toward and away from the rod, a second cylinder formed in the external body and arranged on a second lateral side of the chamber opposite said first lateral side of the chamber, a second piston received in the second cylinder for movement toward and away from the rod, the first and second pistons having each a groove configured to engage a respective end of the locking elements upon movements of the pistons toward the rod so as to move the locking elements against biasing of the biasing members from the locking positions to unlocking positions out of engagement with the rod and to disengage the end of the locking elements upon movements away from the rod so as to allow the biasing members to move the locking elements to the locking positions thereof in engagement with the rod, the biasing members being located between the locking elements and arranged to act in a direction substantially parallel to the rod.

5. A device for locking in position a linear rod that is translatable axially, the device comprising an external body provided internally with a chamber adapted to receive the rod, a pair of locking elements movably supported by the external body and received in the chamber and configured so as to engage and lock the rod in locking positions of the locking elements, biasing members biasing the locking elements away from each other to the locking positions, a first cylinder formed in the external body and arranged on a first lateral side of the chamber, a first piston received in the first cylinder for movement toward and away from the rod, a second cylinder formed in the external body and arranged on a second lateral side of the chamber opposite said first lateral side of the chamber, a second piston received in the second cylinder for movement toward and away from the rod, the first and second pistons having each a groove configured to engage a respective end of the locking elements upon movements of the pistons toward the rod so as to move the locking elements against biasing of the biasing members from the locking positions to unlocking positions out of engagement with the rod and to disengage the end of the locking elements upon movements away from the rod so as to allow the biasing members to move the locking elements to the locking positions thereof in engagement with the rod, the biasing members being retained in seats formed in the locking elements proximate the end that is engaged with the grooves.

6. The device according to claim 1, wherein each of the locking elements has a hole formed in a substantially central position thereof and adapted to receive the rod, edges of the holes being engageable with the rod when the locking elements are in the locking positions.

7. The device according to claim 3, wherein the movements of the locking elements toward and away from each other are pivotal movements about the tongues.

8. A device for locking in position a linear rod that is translatable axially, the device comprising an external body provided internally with a chamber adapted to receive the nod, a pair of locking elements movably supported by the external body and received in the chamber and configured so as to engage and lock the rod in locking positions of the locking elements, biasing members biasing the locking elements away from each other to the locking positions, a first cylinder formed in the external body and arranged on a first lateral side of the chamber, a first piston received in the first cylinder for movement toward and away from the rod, a second cylinder formed in tile external body and arranged on a second lateral side of the chamber opposite said first lateral side of the chamber, a second piston received in the second cylinder for movement toward and away from the rod, the first and second pistons having each a groove configured to engage a respective end of the locking elements upon movements of the pistons toward the rod so as to move the locking elements against biasing of the biasing members from the locking positions to unlocking positions out of engagement with the rod and to disengage the ends/of the locking elements upon movements away from the rod so as to allow the biasing members to move the locking elements to the locking positions thereof in engagement with the rod, and further comprising a spring engaged between the a groove of each piston and the end of one of the locking elements.

9. The device according to claim 3, wherein the biasing members comprise frustoconical wedges co-operating with a seat formed adjacent the end of the locking elements.

10. The device according to claim 9, wherein the frustoconical wedges have longitudinal axes parallel to the axis of the rod.

11. The device according to claim 9, wherein the frustoconical wedges are arranged opposite one another and are subject to a thrusting action tending to produce symmetrical movements away from each other.

12. The device according to claim 11, wherein the thrusting action is produced by a spring engaged between the wedges and acting in a direction substantially perpendicular to the axis of the rod.

* * * * *